Oct. 20, 1931.   J. F. MALSBARY   1,828,195
BLOW-OFF VALVE FOR HOT WATER SYSTEMS
Filed March 30, 1931
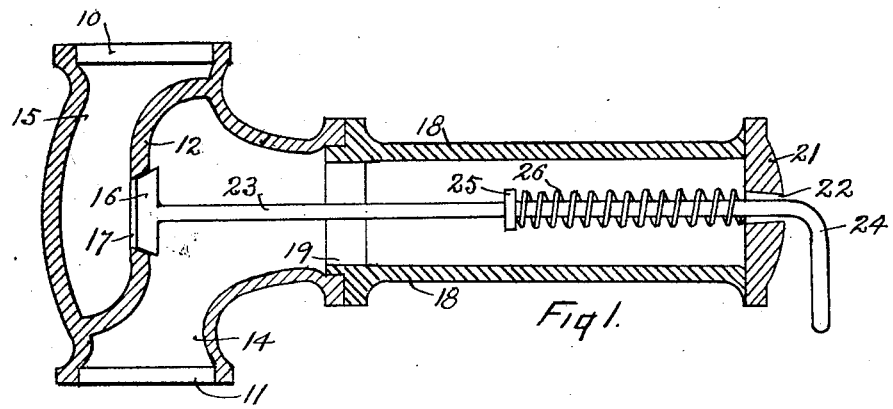
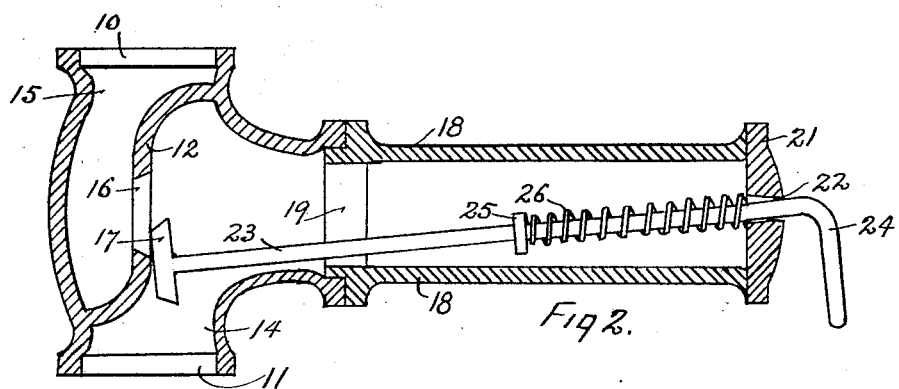
INVENTOR.
Job Fordyce Malsbary
BY
Francis C. Huebner.
ATTORNEY Patented Oct. 20, 1931

1,828,195

UNITED STATES PATENT OFFICE

JOB FORDYCE MALSBARY, OF FRESNO, CALIFORNIA

BLOW-OFF VALVE FOR HOT WATER SYSTEMS

Application filed March 30, 1931. Serial No. 526,399.

My invention relates to a blowoff valve for a hot water system, and more specifically to a valve which can be easily adjusted to operative and inoperative positions.

The objects I have secured are the construction of a blow off valve which is cheap in construction, is effective, and does not easily get out of order, and which can be used as either a blowoff valve or a draw off.

In the drawings accompanying this specification Fig. 1 shows a sectional view of the completed valve when closed. Fig. 2 is a similar view to Fig. 1 showing the valve open.

Referring to the drawings, I have used an ordinary T pipe fitting, having a partition 12 thereon which forms the interior of said fitting into two chambers, 14 and 15. As shown in the drawings chamber 15 has a valve inlet opening 10 which may be connected to the boiler. Chamber 14 has an exhaust outlet 11 which may discharge into space. Partition 12 is provided with an opening connecting said chambers and formed into a valve seat 17. This valve seat is preferably conical. A valve 16 is adapted to fit snugly in seat 17. A valve stem housing 18 is attached to the side opening 19 of the fitting. The valve stem housing has a cap 21 on the outside end thereof. Valve 16 is provided with a stem 23 having a handle 24 at the end opposite to the valve, said stem passing through a hole 22 in cap 21. Hole 22 is formed so that stem 23 fits loosely therein. Stem 23 has a spring stop 25 attached thereto and a compression spring 26 encircles the stem between stop 25 and cap 21.

By the construction described it will be noted that normally valve 16 rests in valve seat 17, and is yieldingly held therein by spring 26. If pressure in chamber 15 is greater than the strength of spring 26, the valve would open sufficiently to let the hot water or steam escape and relieve the pressure in chamber 15, and in any boiler or chamber to which it was directly connected. Valve 16 can be held open by pulling handle 24 outward and upward the result being to lodge valve 16 on the side of the seat as shown in Fig. 2, and thus hold the valve open.

It is also noted that in case particles lodge between the valve and its seat, causing the valve to leak, by manipulating the handle when the valve is seated the valve seat and valve can be cleaned or the valve can be thus reseated.

It is obvious that the valve can be reseated at will by manipulating the handle 24.

Having described my invention I claim:

1. A blowoff valve having a housing containing two chambers separated by a partition, one of said chambers having an inlet opening and the other an outlet opening, said partition having an opening connecting said chambers, said opening being faced as a valve seat, a valve adapted to rest in said seat, said valve being attached to a stem, said stem being adapted to extend through, a guide permitting the valve to be positioned in operative relation with the valve seat and in inoperative relation therewith, and spring means adapted to normally hold the valve in the selective position in which it may be placed.

2. A blowoff valve having a housing and a partition therein forming two chambers, each of said chambers having openings thereto, and an opening through the partition connecting said chambers, the opening in said partition being formed into a valve seat, a valve adapted to fit in said valve seat, a stem attached to the valve, said stem adapting the valve to be moved manually, to operative position and to inoperative position, and spring means adapted to yieldingly hold said valve in either of said selective positons.

JOB FORDYCE MALSBARY.